Feb. 14, 1956  F. L. LE BUS, SR  2,734,695
BALANCED CABLE SPOOLING

Filed July 15, 1954  2 Sheets-Sheet 1

INVENTOR.
BY F. L. LeBus, Sr.
ATTORNEY

United States Patent Office 2,734,695
Patented Feb. 14, 1956

2,734,695
BALANCED CABLE SPOOLING
Franklin L. Le Bus, Sr., Longview, Tex.
Application July 15, 1954, Serial No. 443,599
4 Claims. (Cl. 242—117)

This invention relates to improvements in balanced cable spooling devices. This invention is an improvement over my co-pending application Serial No. 364,071, filed June 25, 1953, and entitled "Balanced Cable Spooling."

The prior application set forth the many advantages for the winding of cable on a drum in a combination parallel and helical path where a majority of the cable on the drum would be wound parallel to the brake flanges on the drum, and providing a progression across the drum by winding a portion of the cable in a helical path through balanced control zones preferably disposed in diametrically opposed positions on the drum. In the prior application, the control zones were provided by a pair of open recessed, or gap portions thereby providing two control zones for progressively bending the cable winds in a slightly helical or curved path from a parallel arrangement in order to cross over the first wind of superimposed layers of cable. In such controlled spooling of cable, high spots on the drum due to cable cross over action would be counterbalanced by a diametrically opposite zone completing the cross over action and effecting dynamic balance of the rotating drum core without any distortion of the rotation or any eccentric rotation of the drum.

The present invention is primarily concerned with improving the subject matter of the aforementioned application by machining or casting the drum core to eliminate the open control zones between the parallel winding sections with a plurality of combined parallel and tapered, or grooved portions on the drum with the tapered groove portions of the drum disposed substantially diametrically opposite each other to effect a counterbalancing in any fast winding of the drum.

It is an important object of this invention to eliminate vibration in a cable winding apparatus operating at high speed revolution by providing cross over control areas cooperating with two parallel winding areas so that the cable wound thereon will be dynamically balanced to eliminate objectionable vibration.

And still another object of this invention is to provide a cable winding drum having machined cable grooves provided thereon wherein there are two sets of parallel grooves, and two sets of helical or tapered grooves co-operating therewith to eliminate distortion during revolution of the drum at high speeds.

And still another object of this invention is to provide a balanced controlled spooling of cable onto a winding drum in order to minimize the chafing of the cable being wound thereon and to overcome any vibration created by cross over high spots of the wound cable by progressively providing for a partial cross over of the wound cable at diametrically opposed positions on the drum.

And still another object of this invention is to control the winding of cable on a winding drum without any excessive vibration through progressive bending of the cable at the cross over portions of multiple layers of cable in at least two separate positions during each revolution to effect a dynamic balance of the drum.

And still another object of this invention is to provide a controlled cable winding apparatus adapted to increase the service life of the cable and minimize chafing as it is being wound on a rotating drum.

Other objects and advantages of the invention will be evident from the following detailed description, read in conjunction with the accompanying drawings, which illustrate my invention.

Figure 1:
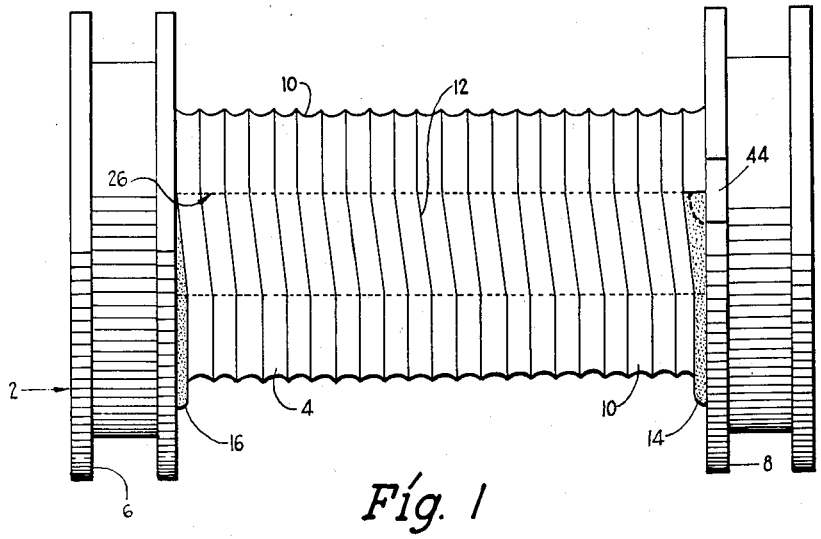
Figure 1 is a side elevational view of a novel cable winding apparatus showing one position of the cable pitch control bars on the drum.
Figure 2:
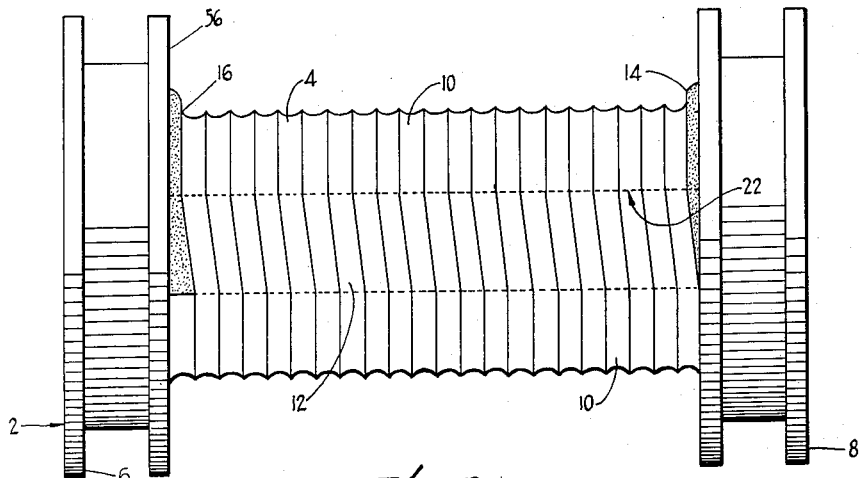
Figure 2 is a similar view to Fig. 1 showing another pitch control bar for the cable.

Referring to the drawings in detail and particularly Figs. 1 and 2, reference character 2 generally designates a hoisting drum having a cylindrical core 4 with concentric brake flanges 6 and 8 provided at the opposite ends thereof. The core 4 of the winding drum is provided with a plurality of parallel grooves 10 cooperating with a plurality of helical or tapered grooves 12. The grooves 10 and 12 are preferably machined, or cast with the core 4, however, not limited thereto. As will be noted in Fig. 3, the parallel grooves 10 extend around the drum core in two separate sets A and B of parallel grooves 10, wherein groove set A is separated from set B by the two different sets of the helical grooves 12 providing two separate control or pitch areas respectively. The set B of parallel bars 10 is also interposed between the helical grooves provided by the control areas. The disposition of the helical grooves 12 relative to the parallel grooves 10 are dependent upon the oppositely disposed control bars 14 and 16 disposed adjacent the inner wall of the drum flanges 6 and 8 respectively as will be hereinafter set forth. The parallel grooves 10 may extend around the circumference of the core 4 any variable distance as will be more fully set forth.

Figure 3:
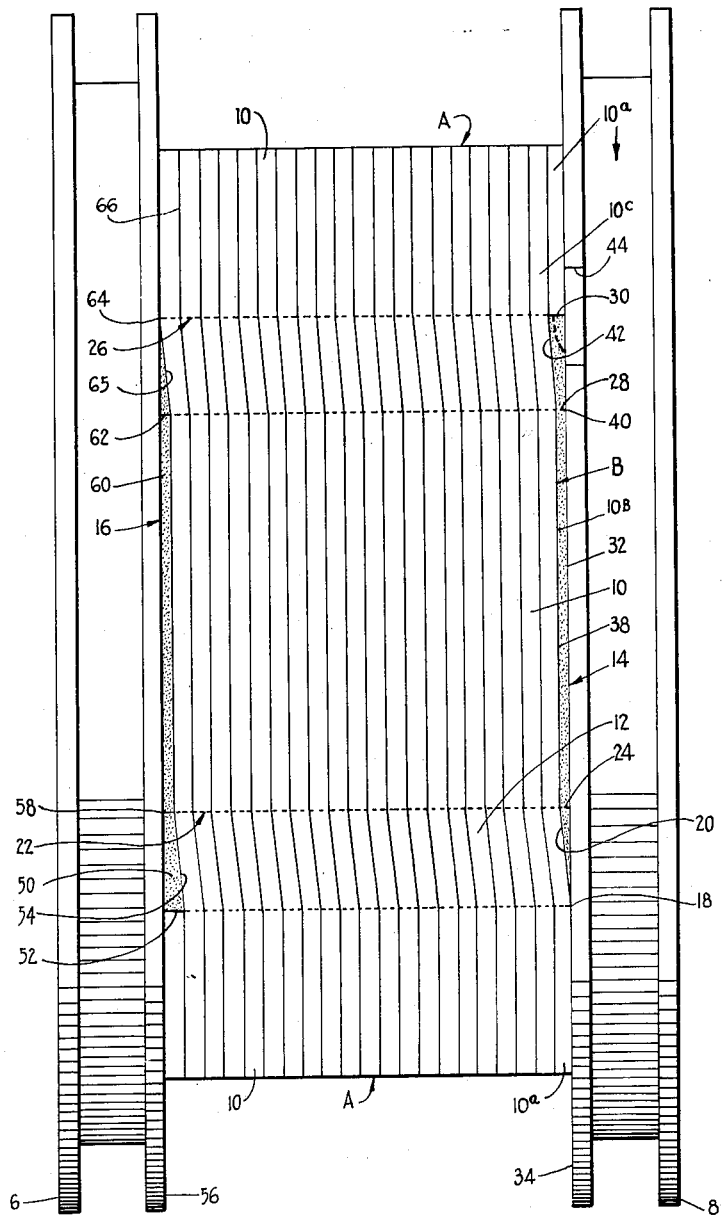
Figure 3 is an evolved plan view of the apparatus shown in Figs. 1 and 2 and illustrates schematically the arrangement of the cable grooves and pitch control bars thereon.

Referring to Fig. 3, it will be noted that the parallel grooves 10 of set A connect with a plurality of helical grooves 12 at a point 18 on the core which is at the start of the lesser tapered surface 20 of the control bar 14. The control or pitch area 22 provided by one set of helical grooves 12 as noted in Fig. 3 preferably connects at 18 with set A of the parallel grooves at a point 24 with the separately spaced set B of parallel grooves 10. In a diametrically opposite position on the circumference of the core 4 is provided a separate and independent pitch area designated 26 through a plurality of the helical grooves 12 joining with the end of the parallel grooves 10 of set B at a point 28 and again connected at a point 30 with the set A of the parallel grooves 10.

As will be apparent in Figs. 1 and 2, the control bar 14 is substantially arcuately shaped for disposition around a portion of the core 4, and has a flat face 32 on one side disposed adjacent the inner wall 34 of the flange 8. The opposite face of the control bar 14 at one end 18 is provided with the tapered portion 20 extending through the length of the pitch area 22. The taper varies from zero at 18 to a pitch equalling one-half the width of the grooves 10, or one-half the diameter of the cable to be wound in the grooves 10 at point 24. The width of the control bar 14 connecting with the tapered portion 20 at point 24 amounts to a one-half pitch, and extends around the core at such constant width 38 through the entire length of the parallel bars 10 comprising set B as shown in Fig. 3 until joining the pitch area 26 at a point 40 on the core where the taper of the bar is progressively increased in an amount equal to another one-half groove width, or diameter of the cable being wound as shown at 42 thereby providing a full or whole pitch at 30. It will be apparent that the full width of the control bar 14 at 30 is intermittently progressed from a zero taper 18 to the full width at point 30 which is equal to the diameter of the cable being wound or the width of the grooves 10.

The brake flange 8 is provided with an aperture 44 through which is disposed the dead end of the cable (not shown) for winding on the drum 2. The cable may be secured to the drum in any suitable manner (not shown). In winding, the cable (not shown) is preferably held under tension and the drum is rotated counter-clockwise as viewed from the outer face of the brake flange 8 for winding cable on the drum in a multiple of layers as desired.

It will be noted from the above that the control bar 14 is disposed adjacent the inner face of the flange 8 and extends around the core 4 a distance sufficient to encompass at least one set of parallel grooves 10 and both sets of helical grooves 12 providing the pitch control areas 22 and 26. Adjacent the inner face 56 of the drum 2 is provided a similar control bar 16 of substantially the same shape and configuration as the bar 14, however, the control bar 16 is disposed on the circumference of the core 4 in an exactly opposite direction from that of the control bar 14 but over the same circumferential length thereon. Referring to Fig. 3, it will be noted that the bar 16 has an end 50 of whole or full width and tapers at 52 which progressively lessens toward the inner face 56 of the drum flange 6 to where the bar taper is diminished substantially fifty percent at point 58. The width of the bar 16 from the point 58 through the parallel set B remains substantially constant as at 60 until connecting with the pitch area 26 at point 62 where the taper again progressively diminishes toward the face 56 until it reaches zero at point 64 at the opposite side of the pitch area 26.

Of particular significance as will be noted from Fig. 3 is that the widest tapered portion of the pitch control bar 14 disposed in the pitch area 26 is in alignment with the thinnest, or smallest tapered portion of the control bar 16 at the opposite side of the core. In similar manner, the smallest or thinnest tapered portion 20 of the bar 14 is in alignment at opposite positions of the core with the thickest tapered portion 54 of the control bar 16 for a purpose as will be hereinafter set forth.

The parallel grooves 10 for set A are preferably machined or cast on the core with one more in number than the number of grooves 10 for set B. If the parallel grooves 10 of the A set is provided with an odd number of grooves, the parallel grooves in B set will be less one and consequently, an even number. In similar manner, if the parallel grooves of the A set are even, the parallel grooves of the B set are less one and consequently odd. However, the invention is not limited to an even or odd disposition of grooves 10 for either set A or B. Set A is provided with one more revolution of grooves 10 and is accounted for by the control bars 14 and 16, and particularly the constant width portions 38 and 60.

*Operation*

In operation, the cable (not shown) may extend through the aperture 44 for rotation on the drum 2 and would encounter the groove 10ᵃ of set A of the parallel grooves, and hence be wound about the core until reaching the point 18 where it would be moved by the taper 20 of the control bar 14 one-half pitch into a helical groove 12 of the first pitch area 22, and hence directed into a groove 10ᵇ of the B set of parallel grooves 10 until reaching the point 40 where it would be again directed a one-half pitch through the progressive taper 42 to be moved over into alignment with a second parallel groove 10ᶜ, after which the operation is repeated upon continued rotation of the drum. It will be apparent that each preceding portion of any wound cable acts as a guide for successive wraps of cable in both the parallel and helical grooves 10 and 12 respectively.

At the end of the first wrap of cable and the beginning of the second wrap at the point 52, the tapered portion 54 of the bar 16 would permit any cable being wound to taper toward the face 56 and in a groove (not shown) between the face and the last wrap of the first layer. As the first wrap of the second layer is wound around the core through the set B portion and point 62, it is directed further by the tapered portion 65 of the bar 16 to be brought in alignment with a grooved portion as would be represented if shown by the last wrap and next to the last wrap of the first layer of cable (not shown), and inferentially designated as 66. It will thus be seen that in the controlling of spooling of cable or wire line on fast revolving drums by the present invention, there is provided a plurality of combined parallel and helical grooves on the rotating drum cooperating with control bars at opposite sides, wherein the bars have portions of tapering thereon in alignment with each other but in divergent directions, and with variable widths at diametrically opposed positions in the control areas on the drum. The above arrangement will provide a progressive cross over of the cable on the drum at said diametrically opposed control areas so that the drum will be dynamically balanced and preclude any eccentric rotation of the drum that might be present because of the cross over action during the controlled winding of a cable thereon. The thicker portion of one control bar is in alignment with the thinner portion of an opposite control bar so that the progressive cross over action takes place between successive layers of cable wraps in an efficient manner.

It will be apparent that the length of the parallel sections A and B and the control areas 22 and 26 may be varied in accordance with the diametrical dimensions of the drum core. In larger drum cores of eight and ten feet in diameter, the size of the control areas 22 and 26 providing the helical grooves 12 are usually less, because of the length of cable travel, whereas, in comparison, the smaller drums revolving at higher speeds the length of the control areas 22 and 26 may approach that of the parallel areas (sets A and B) to assure a proper counterbalancing in the winding operation. The amount of the control areas and the parallel areas are variable not only to permit proper balancing for efficient winding, but to assure proper cross over of the cable in a controlled progressive spooling of the cable with a proper balanced action. It has been found that in larger drum cores using a one and one-quarter inch cable, the size of the control areas may vary from three to five percent of the total circumference, whereas the size of the parallel area may be forty-five to forty-seven percent of the circumference. In comparison, a normal drum core of two to four feet in diameter, the average control area is around fifteen percent of the circumference with the parallel areas around thirty-five percent. As heretofore stated, however, in smaller drums, the control and parallel areas may be equal, or approximately twenty-five percent of the circumference to provide the proper counter-balance.

From the foregoing, it will be apparent that the present invention provides a novel cable winding apparatus which will substantially eliminate excessive vibration at increased revolutions of the winding drum. The winding is accomplished through a parallel set of grooves which are machined or cast onto the drum cooperating with at least two diametrically opposed control areas on the drum having helical grooves machined or cast on the drum and fitting in end to end relation with the parallel grooves. Furthermore, the control areas and at least one set of the parallel grooves cooperate with control bars disposed adjacent the drum flanges to assist in bending the cable progressively during each wind thereof in order to reduce chafing and inherent fatigue from excessive bending and also to assist the control areas in progressively bending the cable for disposition in the helical grooves provided on the drum. The control bars are arranged so that the progressive tapers thereof will provide an efficient operation in cooperation with their respective control areas.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a cable winding apparatus comprising a drum having an essentially cylindrical core with flanges at opposite ends thereof, means providing a combined parallel and helical winding of cable on the outer periphery of the core between the flanges, said means comprising a pair of sets of parallel grooves disposed in diametrically opposed relation on the drum and a pair of sets of helical grooves disposed in diametrically opposed relation on the drum, said sets of helical grooves interposed between the sets of parallel grooves and in end to end relation therewith.

2. In a cable winding apparatus comprising a drum having an essentially cylindrical core with flanges at opposite ends thereof, means providing a combined parallel and helical winding of cable on the outer periphery of the core between the flanges, said means comprising a pair of sets of parallel grooves disposed in diametrically opposed relation on the drum and a pair of sets of helical grooves disposed in diametrically opposed relation on the drum, said sets of helical grooves interposed between the sets of parallel grooves and in end to end relation therewith, a pair of arcuately shaped pitch control bars disposed on the core adjacent the inner face of the core flanges for effecting a progressive cross-over of multiple layers of cable.

3. In a cable winding apparatus comprising a drum having an essentially cylindrical core with flanges at opposite ends thereof, means providing a combined parallel and helical winding of cable on the outer periphery of the core between the flanges, said means comprising a pair of sets of parallel groves disposed in diametrically opposed relation on the drum and a pair of sets of helical grooves disposed in diametrically opposed relation on the drum, said sets of helical grooves interposed between the sets of parallel grooves and in end to end relation therewith, a pair of arcuately shaped pitch control bars disposed on the core adjacent the inner face of the core flanges for effecting a progressive cross-over of multiple layers of cable, said pitch control bars extending around the core complementary to one set of parallel grooves and both sets of helical grooves.

4. In an apparatus as set forth in claim 3 wherein the pitch control bars comprise a tapered end portion of smaller width and an opposite end portion of greater width interposed by an intermediate portion of constant width, said tapered portions in parallel alignment with the helical grooves and said constant width portion in alignment with at least one set of parallel grooves, said control bars disposed in opposite directions to each other around the core where a smaller tapered portion of one bar will be in alignment with a larger tapered portion of the oppositely disposed bar.

References Cited in the file of this patent

UNITED STATES PATENTS

| | | |
|---|---|---|
| 2,620,996 | Le Bus | Dec. 9, 1952 |
| 2,633,629 | Crookston | Apr. 7, 1953 |